United States Patent [19]
Rambaud

[11] Patent Number: 5,299,694
[45] Date of Patent: Apr. 5, 1994

[54] APPARATUS AND PROCESS FOR SEPARATING A MATERIAL IN FLUIDIZED BED FORM AND THE DETECTION OF CLOGGING

[75] Inventor: René C. Rambaud, Bergues, France

[73] Assignee: Aluminum Pechiney, France

[21] Appl. No.: 78,065

[22] Filed: Jun. 18, 1993

Related U.S. Application Data

[63] Continuation of Ser. No. 813,519, Dec. 26, 1991, abandoned.

[30] Foreign Application Priority Data

Dec. 26, 1990 [FR] France .................................. 90 16572

[51] Int. Cl.⁵ .............................................. B07B 4/00
[52] U.S. Cl. ................................. 209/135; 209/139.1; 209/474
[58] Field of Search ............................. 209/133–135, 209/138, 139.1, 140, 141, 151, 154, 474, 502; 406/11, 34, 86, 197

[56] References Cited

U.S. PATENT DOCUMENTS

| | | | |
|---|---|---|---|
| 3,863,428 | 2/1975 | Baxter | 406/35 |
| 3,986,949 | 10/1976 | DiDuca et al. | 209/141 X |
| 4,515,503 | 5/1985 | Snowdon | 406/11 |
| 4,861,464 | 8/1989 | Zaltzman et al. | 209/474 |
| 4,908,124 | 3/1990 | Goldbach et al. | 209/141 X |
| 4,909,676 | 3/1990 | Heep et al. | 406/11 |
| 4,946,044 | 8/1990 | Havrilla | 209/138 |
| 5,048,693 | 9/1991 | Zaltzman | 209/474 |
| 5,071,541 | 12/1991 | Thompson | 209/474 |

FOREIGN PATENT DOCUMENTS

| | | | |
|---|---|---|---|
| 4478 | 1/1979 | Japan | 406/11 |
| 106720 | 6/1985 | Japan | 406/34 |
| 1-45925 | 6/1989 | Japan | 406/11 |
| 2-152819 | 6/1990 | Japan | 406/11 |
| 698876 | 11/1979 | U.S.S.R. | 406/34 |
| 975547 | 11/1982 | U.S.S.R. | 406/34 |

Primary Examiner—D. Glenn Dayoan
Attorney, Agent, or Firm—Pollock, Vande Sande & Priddy

[57] ABSTRACT

Apparatus and method for handling pulverulant material in fluidized bed form. The material is fed into the upper part of a two-part container, whose lower part consists of two independent volumes separated from the upper part by a porous wall comprising two horizontal parts at different levels. A pressure gap is created between the two separate volumes, and the evolution of this gap enables clogging to be detected. When the pressure differential exceeds a predetermined value, the porous wall is cleaned.

5 Claims, 5 Drawing Sheets

APPARATUS AND PROCESS FOR SEPARATING A MATERIAL IN FLUIDIZED BED FORM AND THE DETECTION OF CLOGGING

This application is a continuation, of application Ser. No. 07/813,519, filed on Dec. 26, 1990, now abandoned.

FIELD OF THE INVENTION

The present invention relates to an apparatus using a pulverulent material in the fluidized bed state with a view to its distribution from a container, its transport and, or a physical separation of foreign bodies mixed with it.

BACKGROUND OF THE INVENTION

It is known to transport pulverulent materials in the fluidized state from one point to another. A material is said to be fluidizable if it is in pulverulent form and if its grain size and cohesion are such that blown in air, even at low speed, leads to decohesion of the particles and reduction of internal frictional forces, so that the suspension thus formed behaves like a homogeneous fluid. Such materials are e.g., alumina, cement, plaster, lime, fly ash, calcium fluoride, fillers for rubber and plastic, catalysts, pulverized coal, sulfates, phosphates, metal powders, plastic materials in powder form, food products such as starches, powdered milk, flours.

The following three patents, owned by applicant, are illustrative of the state of the art.

French Patent 2 575 734, entitled "Apparatus for the distribution with a regulated flow rate of a fluidizable pulverulent material", describes an apparatus making it possible to regulate the flow rate of a fluidizable material, namely, alumina.

French Patent 2 575 680, entitled "Fluidized bed apparatus for the continuous separation of two mixed solid phases", described an apparatus making it possible to separate in a product formed by fluidizable fine particles the masses of agglomerated particles unsuitable for fluidization.

French Patent 2 391 136, entitled "Process for the autoregulation of a pneumatic transport", describes a process and an apparatus for the automatic regulation of the flow rate in a fluidized bed transportation system using no mechanical members.

The apparatus according to the invention can apply to any of the aforementioned apparatuses and processes.

The apparatus described in French Patent 2 575 734 comprises (FIG. 1) a storage tank (1) filled with alumina connected to the container (2) by a supply column (3) issuing on the side (7A) of the container (to the left in the drawing), a container (2) having in its lower part (2B), a porous fluidization wall (4) and an intake (5) for fluidization gas at a constant, adjustable pressure, column (6) in its upper part (2A) at the end (7B) opposite to that of the supply column, a balancing and degassing, and an oulet (8) for the fluidized pulverulent material on the face (7B) corresponding to the balancing column and immediately above the porous wall (4).

In the absence of fluidization gas, the pulverulent material stored in the tank (1) drops into the container (2), forming a crumbling slope (10) whose angle with the porous fluidization wall is dependent on the nature and physical state of the pulverulent material.

On supplying the fluidization gas, with the outlet (8) closed, using the pipe (5) and the regulating means (12), through the porous wall (4), the pulverulent material starts to fluidize. It rapidly falls the upper part of the container and then gradually rises in the balancing column to a height h (FIG. 2), which is a function of the fluidization pressure $P_f$ and the average density of the pulverulent material in the balancing column (6). Calculation shows and experience confirms that, when the system is in equilibrium for a given pulverulent material and outlet diameter, the material flow rate is only a function of the pressure of the fluidization gas, which provides an advantageous means for regulating said flow rate.

In reality, the fluidization pressure $P_f$ is balanced by the hydrostatic pressure due to the fluidized bed height h in the balancing column, increased by the pressure drop in the porous wall. The one-to-one relation between the fluidization pressure $P_f$ and the material flow rate consequently presupposes that the pressure drop in the porous wall does not change, i.e., there is no clogging of that wall. This is the case with preferably clean materials having a regular grain size constituting a single fluidizable phase. However, when the material to be distributed forms two solid phases, one of which phases tends to settle under the fluidization conditions, thus one phase when settled on the porous wall increases the pressure drop through the wall. Thus, for a constant fluidization pressure, there is a reduction of the fluidized material height h in the balancing column, as from the flow through the outlet (8).

This problem occurs with fresh alumina, which contains heavy firebrick particles called "sand", which are mixed with the alumina during its calcination and also in the alumina supply system for electrolytic tanks, where alumina used for trapping fluorinated gases emitted by the tanks. This alumina, containing the trapped products, tends to form compact agglomerates, referred to as "scales", which are deposited on the porous wall.

SUMMARY OF THE INVENTION

The invention proposes a means for continuously following the degree of clogging of the porous wall, so as to enable timely intervention for its cleaning.

BRIEF DESCRIPTION OF THE DRAWINGS

FIG. 1 shows the apparatus in the absence of fluidization gas, while FIG. 2 shows the same apparatus in the presence of fluidization gas.

It is firstly useful to point out the relations between the different quantities which govern the fluidization.

The fluidization pressure $P_f$ is equal to:

$$P_f = P_c + d \cdot h$$

in which $P_c$ is the pressure drop through the porous wall,
d is the specific gravity of the pulverulent material in the fluidized state, and h is the pulverulent material height in the balancing column.

In addition, $P_c = k.v$, in which k is the porous wall pressure drop coefficient, and v is the speed of the air through the porous wall.

Under the usual industrial conditions of these systems, the fluidization air flow rate is always relatively low, so that the flow conditions are laminar and consequently the pressure drops through the proportional wall are proportional to the speed.

Figure 1:
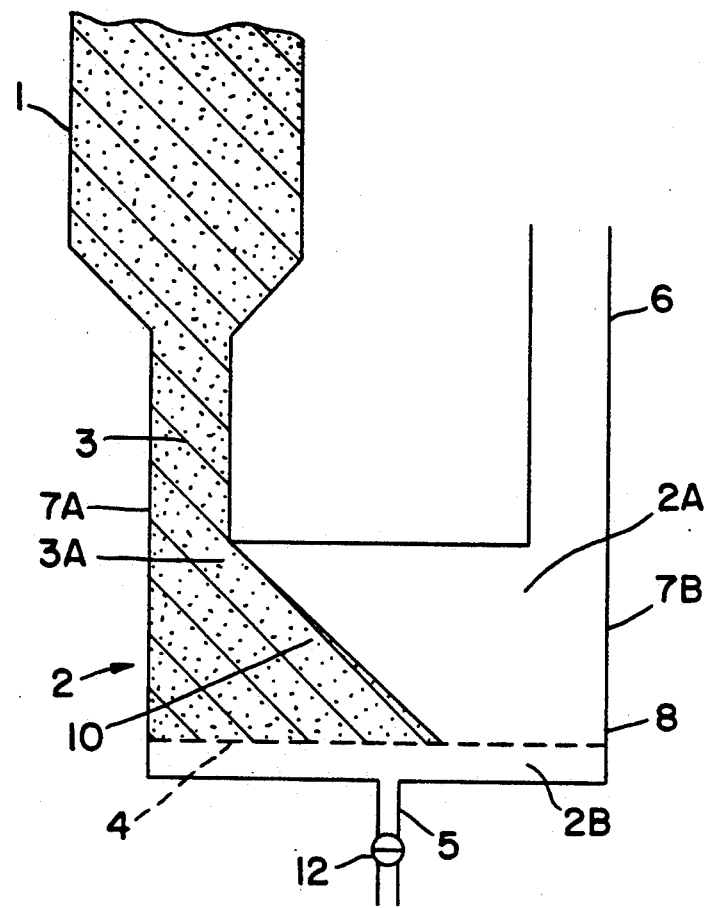
FIG. 1 and 2 show an apparatus according to the prior art disclosed in U.S. Pat. No. 4,692,068.
Figure 2:
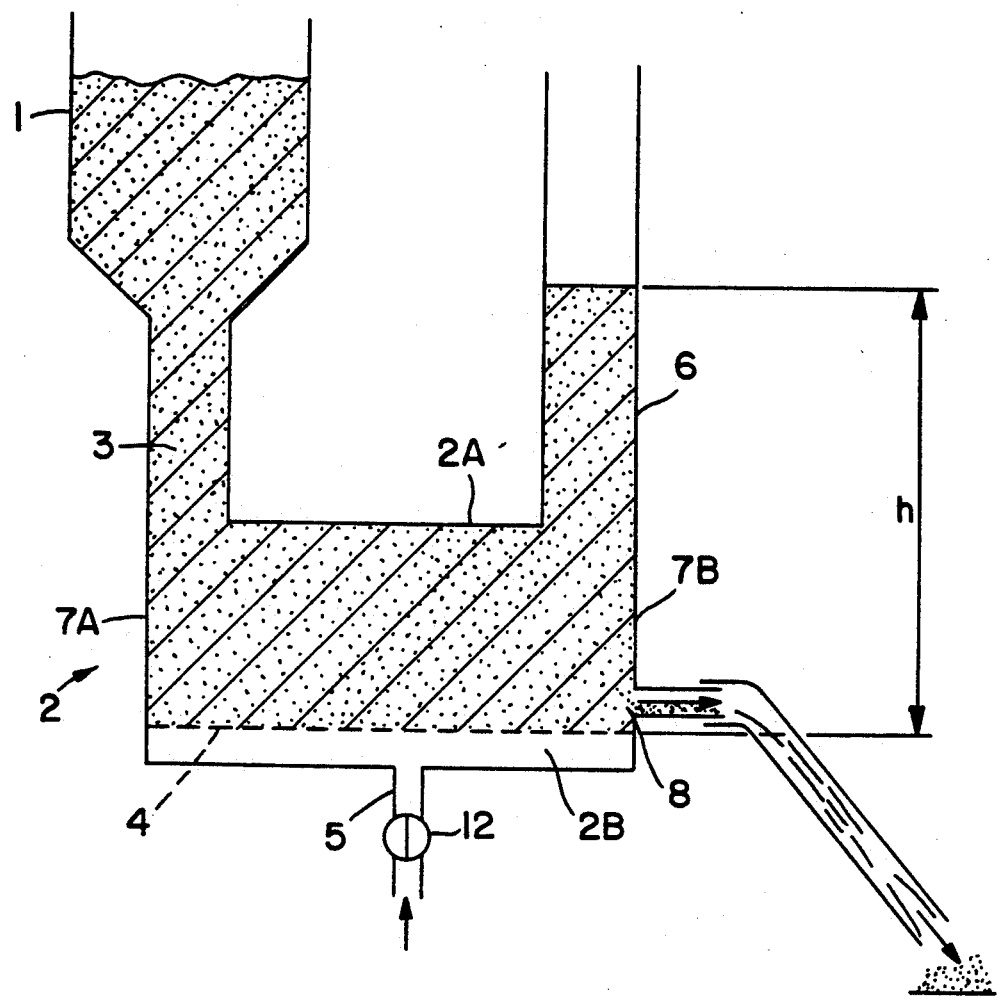
Figure 3:
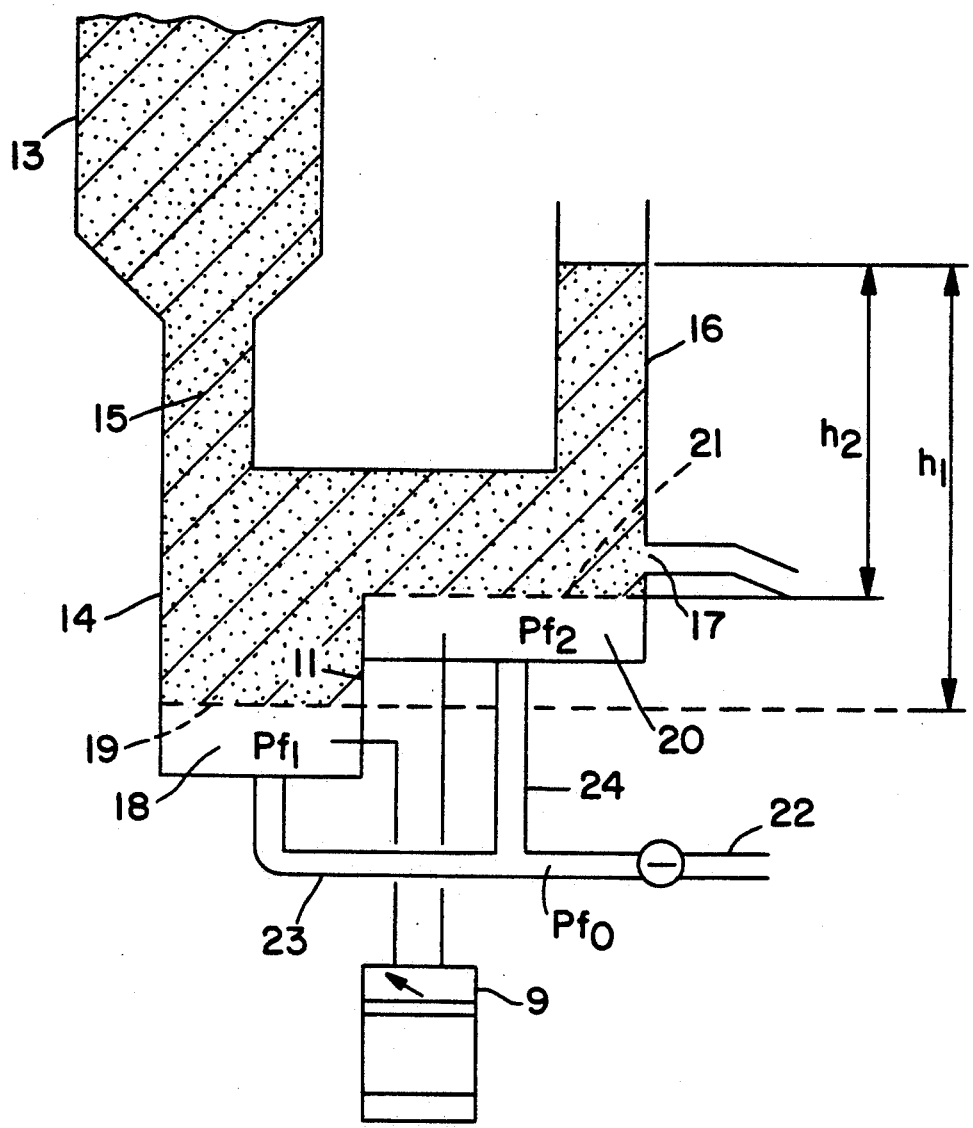
FIG 3 shows the general lay-out of an apparatus according to the present invention.

It has been found that, as a result of their incapacity to fluidize, the sand or scales are deposited on that part of the porous wall located directly at or close to the supply column (3). This finding lead to the design of the apparatus shown in vertical section in FIG. 3. There is again a storage tank (13) connected to the container (14) by a supply pipe (15), the balancing column (16) and the pulverulent material outlet (17). The container, which has a generally rectangular cross-section comprises, vertical section, in two parts, to the left and right in the drawing.

To the left of the drawing, i.e., on the side of the supply pipe, the first fluidization chamber (18) and the first porous wall (19) are at a level lower than that of the second fluidization chamber (20) and the second porous wall (21) of the part of the container located to the right in the drawing, on the side of the balancing column and the outlet (17). The two fluidization chambers (18) and (20) are supplied by a common pipe (22), which subdivides into two branches (23) and (24). The first fluidization chamber (18) and the first porous wall (19) are separated from the second fluidization chamber (2) and the second porous wall (21) by a vertical non-porous wall (11).

At the start of operation, when fluidization gas enters, the pressures balance in the following way. The fluidization pressure in the lefthand part of the drawing $P_{f1}$ is equal to the sum of (a) the pressure drop in the porous wall, proportional to the speed of the fluidization gas, and (b) the barometric pressure of the fluidized bed in the balancing column, proportional to the height of column $h_1$:

$$P_{f1} = P_{c1} + d.k_1$$

in which $P_{c1}$ is the pressure drop through the porous wall and d the apparent density of the fluidized bed.

In the same way, the fluidization pressure in the righthand part of the drawing $P_{f2}$ is equal to:

$$P_{f2} = P_{c2} + c.h_2$$

Thus, there is a differential pressure $$P_{f1} - P_{f2} = d.(h_1 - h_2) + P_{c1} - P_{c2}$$

with $P_{c1} = k_1.v_1$ and $P_{c2} = k_2.v_2$

The porous walls (19) and (21) and identical when clean and free from sand or scales, $k_1 = k_2$. However, as soon as sand or scales are deposited on the wall (19), the pressure drop in the latter wall increases and becomes:

$$P_{c1} = (k_1 + k_x).v_1$$

in which k is a variable pressure drop coefficient increasing with the contamination of the porous wall (19). We finally obtain:

$$P_{f1} - P_{f2} = d.(h_1 - h_2) + (k_1 + k_x).v_1 - k_2.v_2$$

The difference $h_1 - h_2$ is solely dependent on the dimensional difference between the porous walls of the two parts of the container, i.e., on the apparatus geometry. The apparent density d is also constant and is only dependent on the fluidized product. The coefficients $k_1$ and $k_2$ are dependent only on the characteristics of the porous walls. The coefficient $k_x$ increases from zero with the contamination of the porous wall (19).

However, the speeds $v_1$ and $v_2$ are dependent on the fluidization air supply conditions. If $P_{f0}$ is the pressure in the pipe at the point just upstream of the junction supplying the porous walls (19) and (21), it is possible to obtain the value of $v_1$, e.g., by solving the system:

$$P_{f1} = (k_1 + k_x).v_1 + d.h_1$$

$$P_{f1} = P_{f0} - P_{ct1}$$

in which $P_{ct1}$ is the pressure drop in the pipe supplying the container (18).

$P_{ct1}$ is proportional to the square of the flow rate and consequently to the square of the speed of the air traversing the surface $S_1$ of the porous wall (19):

$$P_{ct1} = A.(v_1)^2.$$

The coefficient A is dependent on the geometrical characteristics of the pipe and is proportional to the surface of the porous wall $S_1$ but for a given installation it is constant.

The solution of the system leads to a second degree equation making it possible to calculate $v_1$.

We finally find:

$$v_1 = \frac{-(k_1 + k_x) + ((k_1 + k_x)^2 - 4 \cdot A \cdot (d \cdot h_1 - P_{f0}))^{\frac{1}{2}}}{2A}$$

In the same way, it is possible to calculate $v_2$ by solving the system:

$$P_{f2} = k_2.v_2 + d.h_2$$

$$P_{f2} = P_{f0} - P_{ct2}$$

with $P_{ct2} = B.(v_2)^2$

B, like A being a proportionality coefficient dependent only on the pipe geometry and the surface $S_2$ of the porous wall (21).

We finally obtain:

$$v_2 = \frac{-k_2 + (k_2^2 - 4 \cdot B \cdot (d \cdot h_2 - P_{f0}))^{\frac{1}{2}}}{2 \cdot A}$$

It is interesting to see:

a) the variation of the pressure difference $P_{f1} - P_{f2}$ as a function of $k_x$, the degree of contamination of the wall (19), b) the variation of the speed $v_1$ through the wall (19) as a function of the degree of contamination of said wall a) By transferring the values of $v_1$ and $v_2$ into the expression of $P_{f1} - P_{f2}$ given hereinbefore, it is found that the differential pressure $P_{f1} - P_{f2}$ is the sum of three terms:

a constant term: $d.(h_1 - h_2)$, which is a function of the apparatus geometry by the height $h_1 - h_2$;

a term: $(k_1 + k_x).v_1$ dependent on a certain number of constants linked with the design of the apparatus, the regulating pressure $P_{f0}$ and the contamination degree coefficient $k_x$ of the porous wall (19) on which sand and scales settle;

a term: $k_2 \cdot v_2$, which is dependent on the constant linked with the apparatus design and the regulating pressure $P_{f0}$.

Analysis of the function $P_{f1} - P_{f2} = f(k_x)$ shows that it increases when $k_x$ increases. Therefore the pressure variation increases when the porous wall become contaminated.

b) The analysis of the function $v_1 = g(k_x)$ shows that this function tends towards zero when $k_x$ increases and tends towards infinity. However, the equations given hereinbefore are valid only if $v_1$ is well above a value $v_{mf}$, the minimum fluidization speed for the material in question.

Thus, by the use of means (9) for permanent measurement and possible recording of the differential pressure $P_{f1} - P_{f2}$, it is possible to follow the evolution of the porous wall contamination in the sand and scale settling zone and to automatically or manually initiate the cleaning of the apparatus by fixing a set point for $P_{f1} - P_{f2}$ corresponding to a speed close to, but higher than the minimum fluidization speed below which the apparatus cannot function.

EXAMPLES

EXAMPLE 1

An electrolytic tank alumina supply system was constructed in accordance with the invention. The left-hand part of the container, located below the supply pipe, has a length measured in the direction of the plane of FIG. 3 of approximately 256 cm and a width of approximately 20 cm. The right-hand part of the container has a length of approximately 16 cm and a width of 20 cm. The porous wall in the right-hand part is 20 cm above the porous wall in the left-hand part.

At the start of operation, when the porous wall are free from any clogging, the following parameters are obtained:

Fluidization pressure $P_{f1} = 650$ mm water column (6375 Pa)

Fluidization pressure $P_{f2} = 600$ mm water column (5884 Pa).

Bed height in the balancing column = 58 cm.

With an outlet diameter of 19 mm, an alumina flow rate of 25,000 g/minute is obtained.

The difference of the fluidization pressures, initially 50 mm water column (490 Pa), progressively increases during operation. It is continuously recorded and when it reaches the value 90 mm water column (883 Pa), the installation is stopped and the porous wall cleaned.

This example is given solely for illustration. It is clear that the dimensioning of the porous surfaces, the ratio between the left and right-hand porous surfaces and the dimensional differences between these surfaces are dependent on the nature of the product supplied, its sand and scale content, the flow rate to be provided and the admissible time between two successive cleaning operations.

EXAMPLE 2

Figure 4:
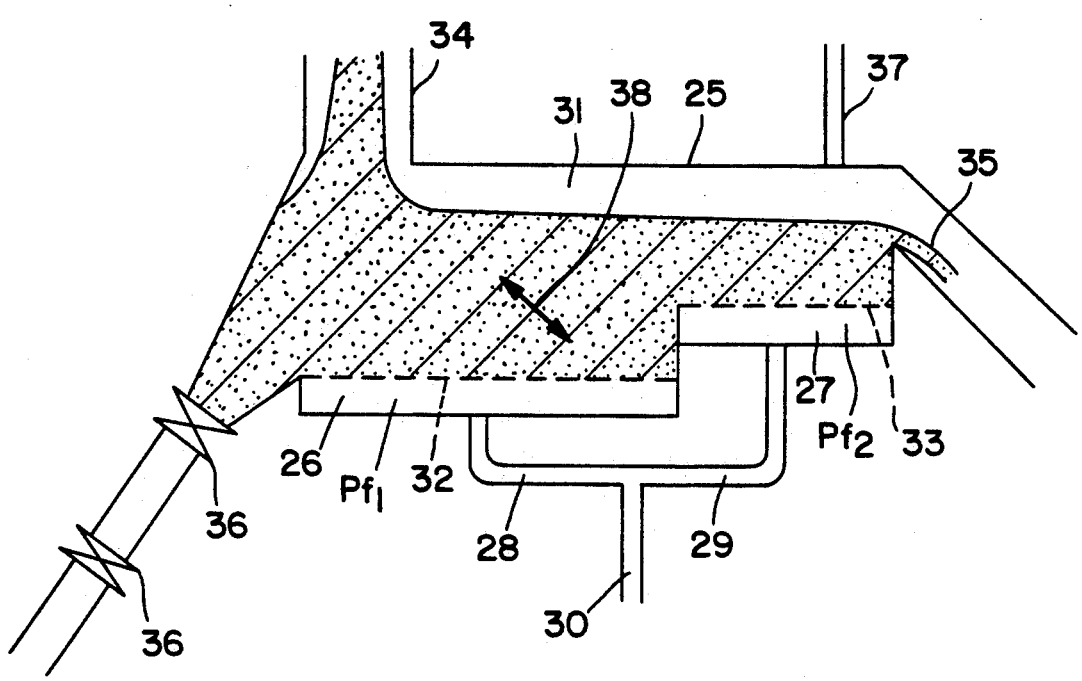
FIG. 4 shows a particular embodiment of the invention in which the apparatus according to the invention is combined with a vibrating system giving to the porous wall an alternating movement, as disclosed in U.S. Pat. No. 4,741,443.

The object of the present invention was applied to the apparatus claimed in French Patent 2 575 680. This application is shown in FIG. 4.

It permits the separation of a fluidizable pulverulent material from a non-fluidizable material mixed therewith. An enclosure (25), suspended by elastic means (not shown), is constituted by two lower containers (26, 27) supplied with fluidization gas by two branches (28,29) from a common pipe (30) and a common upper container (31). The two containers are separated by a porous wall in two parts (32,33), the container (26) and the porous wall (32) on the material supply side being positioned lower than the container (27) and the porous wall (33) on the material outlet side. The upper container has a mixed supply (34) of the fluidizable and non-fluidizable material, an overflow (35) for the discharge of the fluidized phase, a lock system (36) for the discharge of the non-fluidized, solid phase settled on the part (32) of the porous wall, a fluidization as discharge tube (37) and a vibrating system given the porous wall an alternating movement in the direction of the arrow (38).

During operation, the particles of non-fluidizable material are deposited on the porous wall (32), leading to an increase in the pressure difference $P_{f1} - P_{f2}$. When this difference reaches a predetermined value, the starting up of the vibration system and the opening of the lock (36) are automatically triggered, which brings about the cleaning of the porous wall. Once the pressure deference has returned to its initial level, vibration is stopped and the lock is closed again.

EXAMPLE 3

Figure 5:
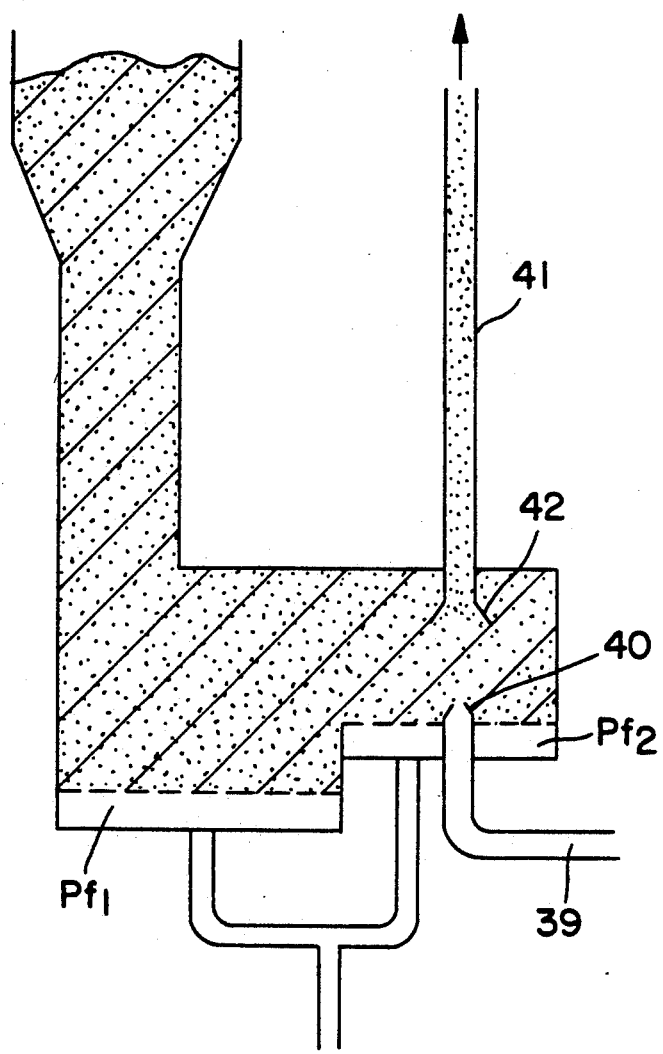
FIG. 5 shows a particular embodiment of the invention in which the apparatus according to the invention is combined with the device for pneumatic transportation disclosed in U.S. Pat. No. 4,279,549.

The object of the present invention was applied to the process claimed in French Patent 2 391 136. This application is shown in FIG. 5. A certain number of characteristics already described in the previous examples occur again here, namely the fluidization enclosure with the lower container and the vertically displaced, two-part porous wall and the pulverulent material supply column. The apparatus also comprises an overpressure gas supply pipe (39) issuing above the porous wall by an injector (40) and a pipe use for pneumatic transportation (41) equipped with a nozzle (42) positioned vertically of the injector. As explained in French Patent 2 391 136, this system makes it possible to automatically regulate the pulverulent material flow rate. However, as the operation can be disturbed by the presence of non-fluidizable material, the addition of the system with two porous wall levels and the checking of the fluidization pressure difference makes it possible to detect the degree of clogging of the porous wall and carry out a cleaning thereof in good time.

I claim:

1. Apparatus for handling pulverulent material in a fluidized bed mixed with non-fluidizable products and equipped with a clogging detection system comprising:
   (a) pulverulant material storage means (13);
   (b) fluidization means constituted by a two-part container (14) comprising an upper part having a first end connected to said storage means by a supply column (15) and a second end connected to a balancing column (16), and comprising a lower fluidization gas supply part separated from said upper part by first and second porous walls (19, 21); and
   (c) means for discharging pulverulent material located in said upper part of said container, at the end opposite to said supply column;
   (d) said first porous wall (19) being located below said supply column and in an area adjacent thereto, and said second porous wall (21) being located below said balancing column and in an area adjacent thereto, said first porous wall (19) being located at a horizontal level below that of said second porous wall (21);

(e) said lower part of said container being subdivided into first and second independent volumes (18, 20) respectively located below each of said porous wall, said first independent volume (18) and said first porous wall (19) being separated from said second independent volume (20) and said second porous wall (21) by a vertical non-porous wall (11);

(f) each of said independent volumes being supplied with fluidization gas by a common pipe (22) subdivided into two branches (23, 24); and (g) in order to detect pressure increases in said first volume (18) caused by clogging above said first porous wall (19), said apparatus comprises means for measuring and recording, as a function of time, a difference in pressure between said first and second independent volumes.

2. Apparatus for the distribution with a regulated flow rate and for clogging detection with respect to a fluidizable pulverulent material according to claim 1, wherein the fluidized material discharge means is constituted by a pulverulent material outlet (17) positioned immediately below said second porous wall.

3. Apparatus for handling a fluidized pulverulent material and for the separation of a non-fluidizable material mixed therewith in accordance with claim 1, said apparatus being provided with a vibrating system able to impart to said first and second porous walls an alternating movement, a lock system permitting the discharge of the non-fluidized solid phase settled on the lowest part of said first porous wall, the fluidized material discharge means being constituted by an overflow located in that part of the upper container opposite to that of the supply column.

4. Apparatus for transportation at a regulated flow rate and for the detection of clogging with respect to a fluidizable pulverulent material according to claim 1, wherein the fluidized material discharge means is constituted by:

a) an overpressure gas supply pipe (39) issuing by an injector (40) into the upper part of the container above said first porous wall, b) a vertical conveying pipe (41) equipped in its bottom with a nozzle (42) positioned vertically and above the injector.

5. Process for detection of clogging in apparatus for handling pulverulent material in a fluidized bed mixed with non-fluidizable products, said process comprising the steps of:

(a) feeding pulverulent material from storage means (13) through a supply column (15) into an upper part of a two-part container (14), said upper part having a first end connected to a supply column (15) and a second end connected to a balancing column (16), a lower part of said container consisting of first and second independent volumes (18, 20) respectively separated from said upper part by first and second porous walls (19,21 ) a horizontal level of said first porous wall (19) being lower (18) located below said supply column being lower than a horizontal level of said second porous wall (21) located below said balancing column (2), said first independent volume (18) and said first porous wall (19) being separated from said second independent volume (20) and said second porous wall (21) by a vertical non-porous wall (11);

(b) supplying fluidization gas by a common pipe (22) subdivided into two branches (23, 24) into said first and second independent volumes (18, 20) in order to create a fluidized bed in said upper part of said container;

(c) discharging said pulverulent material in said upper part of said container at the end opposite to said supply column;

(d) continuously checking for an increase in pressure differential between said first and second independent volumes (18, 20) of said lower part constituting the fluidization means; and (e) cleaning said first porous wall (19) separating the lower fluidization gas supply from said upper part when said pressure differential exceeds a predetermined value.

* * * * *